US011408474B2

(12) United States Patent
Knoop

(10) Patent No.: US 11,408,474 B2
(45) Date of Patent: Aug. 9, 2022

(54) GUIDE ASSEMBLY FOR A DISC BRAKE

(71) Applicant: Meritor Heavy Vehicle Braking Systems (UK) Limited, Cwmbran Gwent (GB)

(72) Inventor: Dietmar Knoop, Cwmbran Gwent (GB)

(73) Assignee: Meritor Heavy Vehicle Braking Systems (UK) Limited, Cwmbran (GB)

( * ) Notice: Subject to any disclaimer, the term of this patent is extended or adjusted under 35 U.S.C. 154(b) by 204 days.

(21) Appl. No.: 16/986,371

(22) Filed: Aug. 6, 2020

(65) Prior Publication Data

US 2021/0048079 A1 Feb. 18, 2021

(30) Foreign Application Priority Data

Aug. 16, 2019 (EP) ..................................... 19192146

(51) Int. Cl.
*F16D 55/2265* (2006.01)
*F16D 65/00* (2006.01)
*F16D 55/00* (2006.01)

(52) U.S. Cl.
CPC ......... *F16D 65/0087* (2013.01); *F16D 55/00* (2013.01); *F16D 65/0068* (2013.01); *F16D 2055/0016* (2013.01)

(58) Field of Classification Search
CPC ............... F16D 55/22655; F16D 55/00; F16D 65/0087; F16D 65/0068; F16D 2055/007; F16D 2055/0016
See application file for complete search history.

(56) References Cited

U.S. PATENT DOCUMENTS

| 3,656,590 | A | | 4/1972 | Newstead | |
|---|---|---|---|---|---|
| 6,026,938 | A | * | 2/2000 | Demoise, Jr. | ..... F16D 55/22655 188/73.35 |
| 9,284,999 | B2 | * | 3/2016 | Gerber | .............. F16D 55/22655 |
| 9,435,391 | B2 | * | 9/2016 | Loew | .................. F16D 65/0087 |
| 9,863,490 | B2 | * | 1/2018 | Gaye | .................... F16D 65/0006 |
| 9,869,357 | B2 | * | 1/2018 | Knoop | .................. F16D 55/225 |
| 10,054,175 | B2 | * | 8/2018 | Kula | ...................... F16D 55/226 |
| 10,197,119 | B2 | * | 2/2019 | Gaye | ................. F16D 55/22655 |
| 10,781,872 | B2 | * | 9/2020 | Jedele | .................. F16D 55/227 |
| 2014/0116817 | A1 | * | 5/2014 | Morais | .................. F16D 55/227 188/73.44 |

(Continued)

FOREIGN PATENT DOCUMENTS

| CN | 201206605 Y | 3/2009 |
|---|---|---|
| CN | 102216641 A | 10/2011 |

(Continued)

OTHER PUBLICATIONS

Extended European Search Report dated Feb. 24, 2020, for related European Appln. No. 19192146.9; 7 Pages.

(Continued)

*Primary Examiner* — Thomas W Irvin
(74) *Attorney, Agent, or Firm* — Brooks Kushman PC

(57) ABSTRACT

A guide assembly for a disc brake and a method of arrangement. The guide assembly includes a guide pin and a sliding bore that receives the guide pin. A first face mating interface of the sliding bore may define a first sliding interface between the guide pin and the bore.

15 Claims, 10 Drawing Sheets

(56) References Cited

U.S. PATENT DOCUMENTS

| | | | |
|---|---|---|---|
| 2015/0122599 A1* | 5/2015 | Loew | F16D 65/0087 188/73.45 |
| 2016/0215834 A1* | 7/2016 | Knoop | F16D 65/0068 |
| 2016/0273596 A1* | 9/2016 | Gaye | F16D 55/227 |
| 2020/0132142 A1* | 4/2020 | Jedele | F16D 55/227 |
| 2021/0048078 A1* | 2/2021 | Knoop | F16D 65/0087 |
| 2021/0048080 A1* | 2/2021 | Thomas | F16D 65/0087 |
| 2021/0048081 A1* | 2/2021 | Thomas | F16D 65/0087 |

FOREIGN PATENT DOCUMENTS

| | | |
|---|---|---|
| CN | 103291786 A | 9/2013 |
| CN | 103562585 A | 2/2014 |
| CN | 104822960 A | 8/2015 |
| CN | 105793597 A | 7/2016 |
| CN | 109838481 A | 6/2019 |
| DE | 2756856 A1 | 6/1978 |
| EP | 2034209 A1 | 3/2009 |
| EP | 3026286 A2 | 6/2016 |
| EP | 3101301 A1 | 12/2016 |
| JP | S5487357 A | 7/1979 |
| WO | 2013143980 A1 | 10/2013 |

OTHER PUBLICATIONS

Office Action for Corresponding China Patent Application No. 202010776765.X; dated Nov. 29, 2021, 10 pages.

* cited by examiner

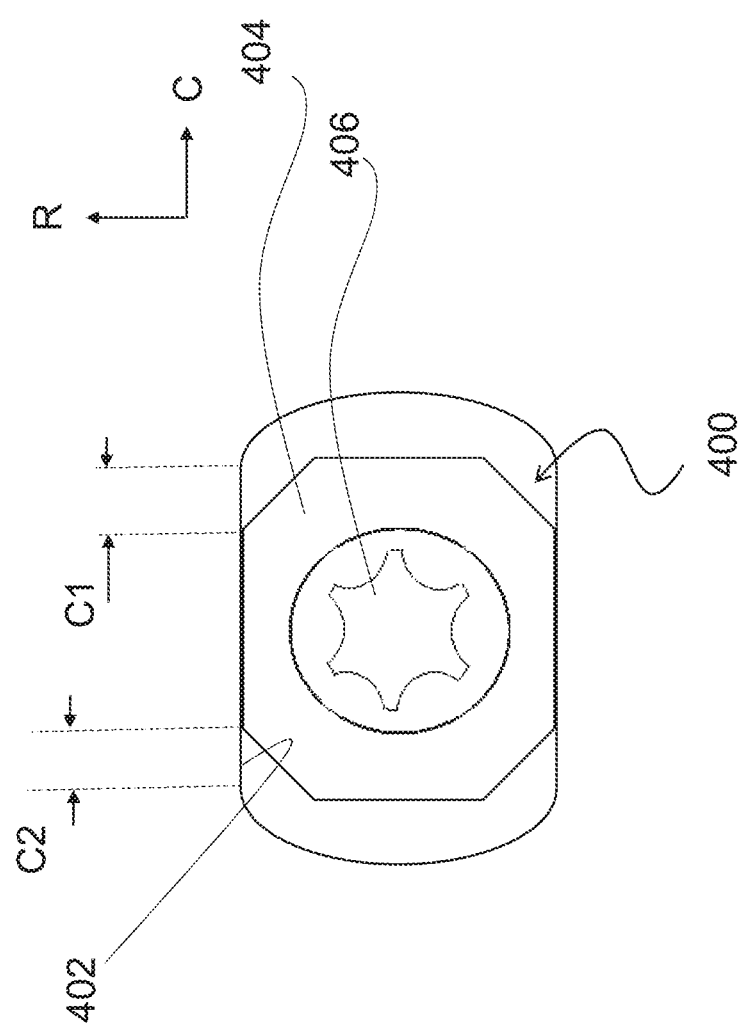

GUIDE ASSEMBLY FOR A DISC BRAKE

TECHNICAL FIELD

The present teachings relate to a disc brake. In particular, but not exclusively, to a guide assembly for a disc brake.

BACKGROUND

Disc brakes are commonly used for braking heavy vehicles such as trucks, buses and coaches.

Heavy vehicle disc brakes typically comprise a brake carrier, a brake caliper and a brake rotor. The brake carrier is arranged to carry brake pads on each side of the brake rotor. The brake caliper is mounted on the brake carrier and slidably supported by at least one guide assembly such that, when the disc brake is actuated, the brake caliper is able to slide with respect to the brake carrier. As the brake caliper slides inboard, the brake pads are urged onto the opposing faces of the rotor in a clamping action and a braking action is achieved.

The guide assembly comprises a guide pin. The guide pin can be secured to the brake carrier and slidably arranged in a sliding bore disposed in the brake caliper so that the brake caliper can slide along the guide pin relative to the brake carrier. In an alternative configuration of the disc brake, the guide pin can be coupled to the brake caliper and the guide pin slidably arranged in a sliding bore disposed in the brake carrier. Consequently, the brake caliper can slide relative to the brake carrier as the guide pin slides within the sliding bore of the brake carrier.

Typically, the guide pin has generally circular cross-sectional profile, and the sliding bore has a generally circular or oval profile.

This arrangement has been proven over many years of usage. However, the present inventors have realized that the geometry of the guide pin and the sliding bore can lead to a limited line contact between the guide pin and the sliding bore. Such contact increases the stress of the components, leading to high wear rates, noise and restriction of suitable materials.

The present teachings seek to overcome or at least mitigate the problems of the prior art.

SUMMARY

A first aspect provides a guide assembly for a disc brake. The guide assembly comprises: a guide pin comprising a guiding portion with a polygonal cross-sectional profile, the guiding portion comprising a first pin face; and a sliding bore to receive the guiding portion, the sliding bore comprising a first bore face; wherein the first pin face and first bore face have corresponding profiles and form a first face mating interface when the guiding portion is received in the sliding bore, the first face mating interface defining a first sliding interface between the guide pin and the bore.

At least a partial face mating interface forms between the first pin face and first bore face when the guiding portion is received in the sliding bore. To optimize the first sliding interface, preferably a substantially full face mating contact forms between the first pin face and first bore face.

By configuring the guiding portion and sliding bore to have a face mating interface, the contact area of the first sliding interface between the guide pin and the sliding bore is superior to the typical line contact formed between a conventional guide pin and sliding bore arrangement. Consequently, stress and wear between the components may be reduced and the sliding action of the brake caliper may be improved. In addition, damping between the guide pin and sliding bore is increased and rattling may be reduced. Due to the reduced stress and wear, a broader range of materials may be suitable for the guide pin. These materials may be lower in cost, lighter in weight, easier to manufacture, have a lower friction coefficient and/or better noise damping characteristics.

The guiding portion may comprise a second pin face and the sliding bore may comprise a second bore face, wherein the second pin face and second bore face have corresponding profiles and form a second partial face mating interface when the guiding portion is received in the sliding bore. This additional mating contact defines a second sliding interface between the guide pin and sliding bore which further helps to reduce stress, wear and noise and enhances the sliding action of the brake caliper.

The second face mating contact is at least a partial face mating contact, preferably a substantially full face mating contact between the second pin face and second bore face.

The first pin face and second pin face may be opposing pin faces, and the respective first bore face and second bore face may be opposing sliding bore faces.

The first sliding interface and second sliding interface may be formed simultaneously when the guiding portion is received in the sliding bore.

The first sliding interface and second sliding interface may be formed separately, sequentially or alternatively when the guiding portion is received in the sliding bore. For example, as the brake caliper deflects during the operation of the disc brake.

The guide assembly may comprise a one or more clearance between the guide pin and sliding bore when the guiding portion is receiving in the sliding bore. The one or more clearance may comprise a circumferential clearance and/or a radial clearance between the sliding bore and the guiding portion. Clearance between the guide pin and the sliding bore advantageously allows for deflection and deformation under load, so that the risk of the guide pin jamming in the sliding bore is reduced.

The guiding portion may have a regular polygonal cross-sectional profile or an irregular polygonal cross-sectional profile. Due to its polygonal shape, the guiding portion has multiple pin faces, and the first pin face and optional second pin face are selected faces of the multiple pin faces. Preferably the polygonal cross-sectional profile is substantially constant along the length of the guiding portion such that the pin faces extend substantially along the length of the guiding portion. The guiding portion may for example have a generally triangular cross-sectional profile with three pin faces, a square, rectangular, or trapezoidal cross-sectional profile with four pin faces, a pentagonal, hexagonal or an octagonal cross-sectional profile with five, six and eight pin faces, respectively.

The corresponding first pin face and first sliding bore face may be substantially flat (planar) or curved. The optional corresponding second pin face and second sliding bore face may be substantially flat (planar) or curved.

The guide pin may further comprise a mounting portion to mount the guide pin on a supporting member. The mounting portion may be press fitted, shrink fitted, welded and/or screwed to the supporting member. The supporting member may be a brake carrier or brake caliper, depending on the configuration of the disc brake and sliding bore. When the guide pin is mounted on the supporting member, the guiding portion is configured to extend from the supporting member so that it can be received in the sliding bore.

The guide pin may comprise a fastening to further secure the guide pin to the supporting member. The fastening may comprise any suitable releasable fastener such as a bolt, screw, or releasable locking pin. Alternatively, the fastening may be a permanent or semi-permanent fastening such as a rivet.

In an embodiment of a guide pin, the guide pin may comprise a guide sleeve defining the cross-sectional profile of the guiding portion and a fastening bolt to secure the guide sleeve to the supporting member. The guide sleeve can be manufactured in a variety of polygon shapes easily and for a low cost.

In an alternative embodiment, the guide pin may comprise a monolithic body defining the polygonal cross-sectional profile of the guiding portion. The monolithic body may be a bar member and the use of a monolithic bar member as a guide pin avoids additional machining and multiple component parts.

In an embodiment, the sliding bore may be arranged in a brake caliper and the supporting member may be a brake carrier, whereby the guiding portion of the guide pin is slidably received in the sliding bore and forms at least the first sliding interface, and the mounting portion of the guide pin is mounted on the brake carrier.

In an alternative embodiment, the sliding bore may be arranged in a brake carrier and the supporting member may be a brake caliper, whereby the guiding portion of the guide pin is slidably received in the sliding bore and forms at least the first sliding interface, and the mounting portion of the guide pin is mounted on the brake caliper.

The sliding bore may be defined by a through hole (bore), recess or slot formed in the brake caliper or brake carrier to receive the guide pin and form at least the first sliding interface. Alternatively, the sliding bore be defined by a bush disposed within a through hole formed in the brake caliper or brake carrier.

The first bore face may comprise a first inner surface of the sliding bore, and optionally the second bore face may comprise a second inner surface of the sliding bore.

A second aspect of the teachings relates to a disc brake comprising: a brake carrier; a brake caliper; and a guide assembly according to the first aspect of the teachings.

The guide pin may be mounted to the carrier and may extend inboard of the carrier.

A third aspect of the teachings relates to a method for slidably arranging a guide pin of disc brake, the method comprising: providing a guide pin comprising a guiding portion with a polygonal cross-sectional profile, the guiding portion comprising a first pin face; providing a sliding bore, the sliding bore comprising a first bore face, wherein the first bore face has a corresponding profile to the first pin face; locating the guiding portion in the sliding bore; and forming a first face mating contact between the first pin face and first bore face, wherein the first face mating contact defines a first sliding interface between the guide pin and the sliding bore.

If the guiding portion further comprises a second pin face and the sliding bore further comprises a second bore face, where the second bore face has a corresponding profile to the second pin face, the method may further comprise:

forming at second face mating contact between the second pin face and second bore face, wherein the at least partial face mating contact defines a second sliding interface between the guide pin and the sliding bore.

BRIEF DESCRIPTION OF THE DRAWINGS

For a better understanding of the present teachings, reference will now be made by way of example only, to the accompanying drawings, in which:

FIG. 10 is an enlarged inboard end view of a guide pin and sliding bore according to a fifth embodiment of a guide assembly of the present teachings, where the guide pin comprises a guide sleeve with an octagonal profile.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

With reference to FIGS. 1 to 10, a disc brake according to the present teachings is indicated generally at 1.

Various orientations of the disc brake are described. In particular the directions inboard I and outboard O refer to the typical orientation of the disc brake when fitted to a vehicle and with reference to the longitudinal center line of the vehicle. The radial direction R refers to an orientation with reference to the center of the rotor (axis A-A) and is for example the direction in which brake pads may be fitted and removed from a disc brake. The circumferential direction C refers to a tangent to the direction of the rotation of the rotor and is for example the direction in which a friction induced load from a brake pad is laterally transmitted into an abutment of a brake carrier.

Figure 1:
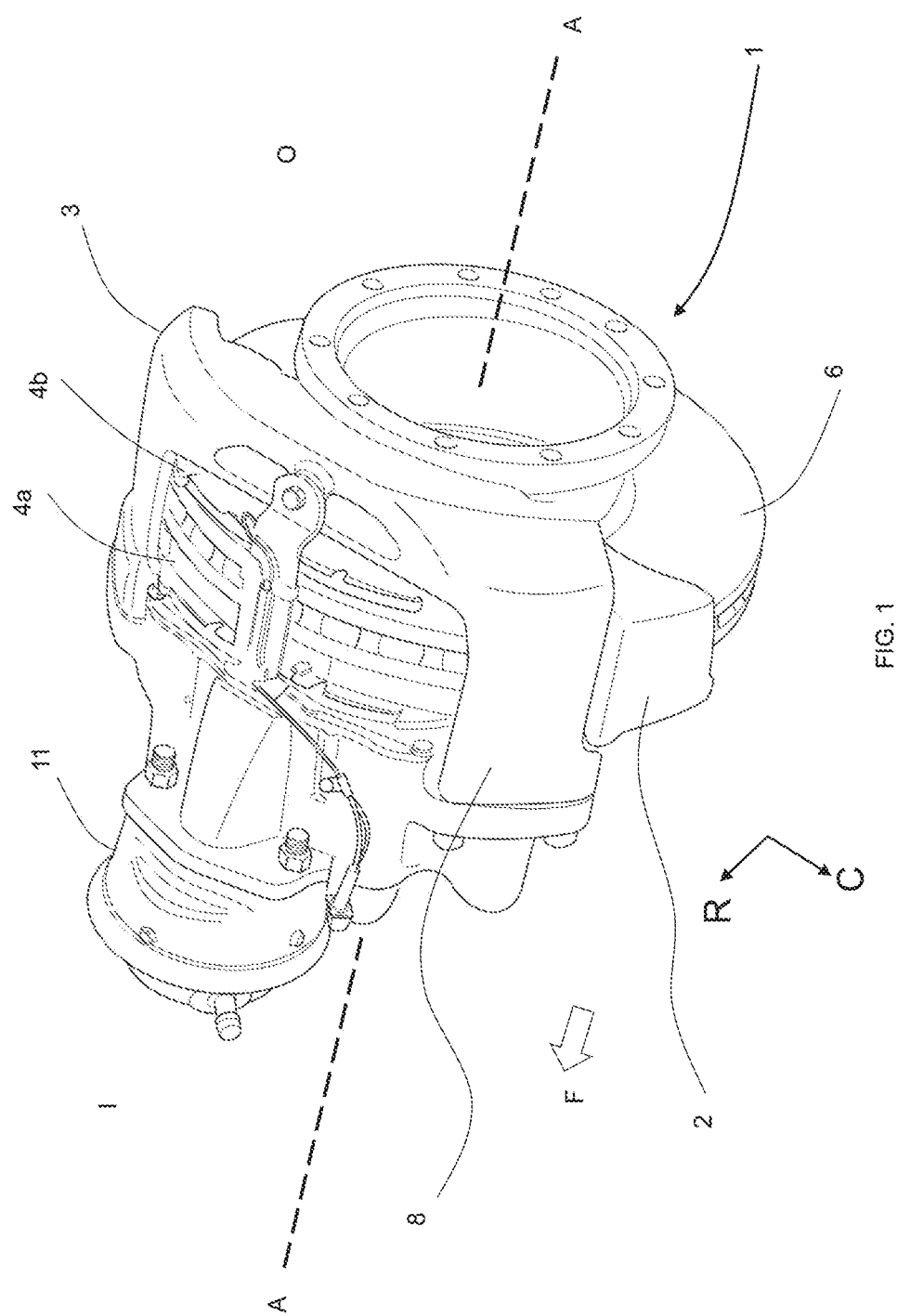
FIG. 1 depicts an isometric view of an embodiment of a disc brake according to the present teachings.

With reference to FIG. 1, the disc brake 1 comprises a brake carrier 2. The brake carrier 2 carries an inboard brake pad 4*a* and an outboard brake pad 4*b*. A brake rotor 6 is positioned between the brake pads and is rotatable about an axial axis A-A. A brake caliper 8 is slidably mounted with respect to the brake carrier 2 by at least one guide assembly.

Figure 2:
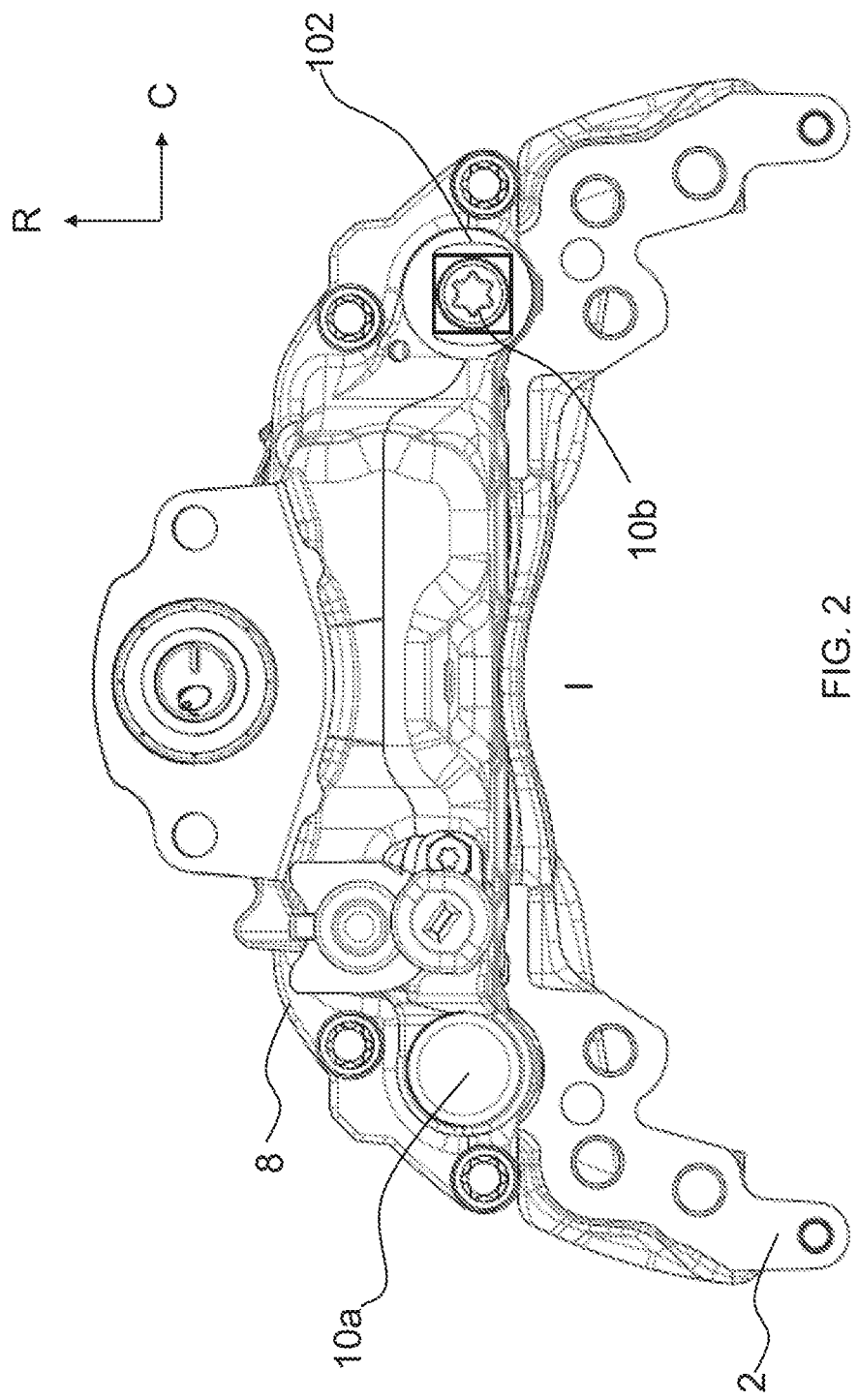
FIG. 2 is a view of an inboard face the disc brake of FIG. 1 with no air actuator present.

The disc brake 1 comprises at least one guide assembly. In the embodiment depicted, the disc brake comprises two guide assemblies 10a, 10b (FIG. 2). Each guide assembly comprises a guide pin and a sliding bore arranged in sliding engagement to allow the brake caliper 8 to slide relative to the brake carrier 2.

Figure 3:
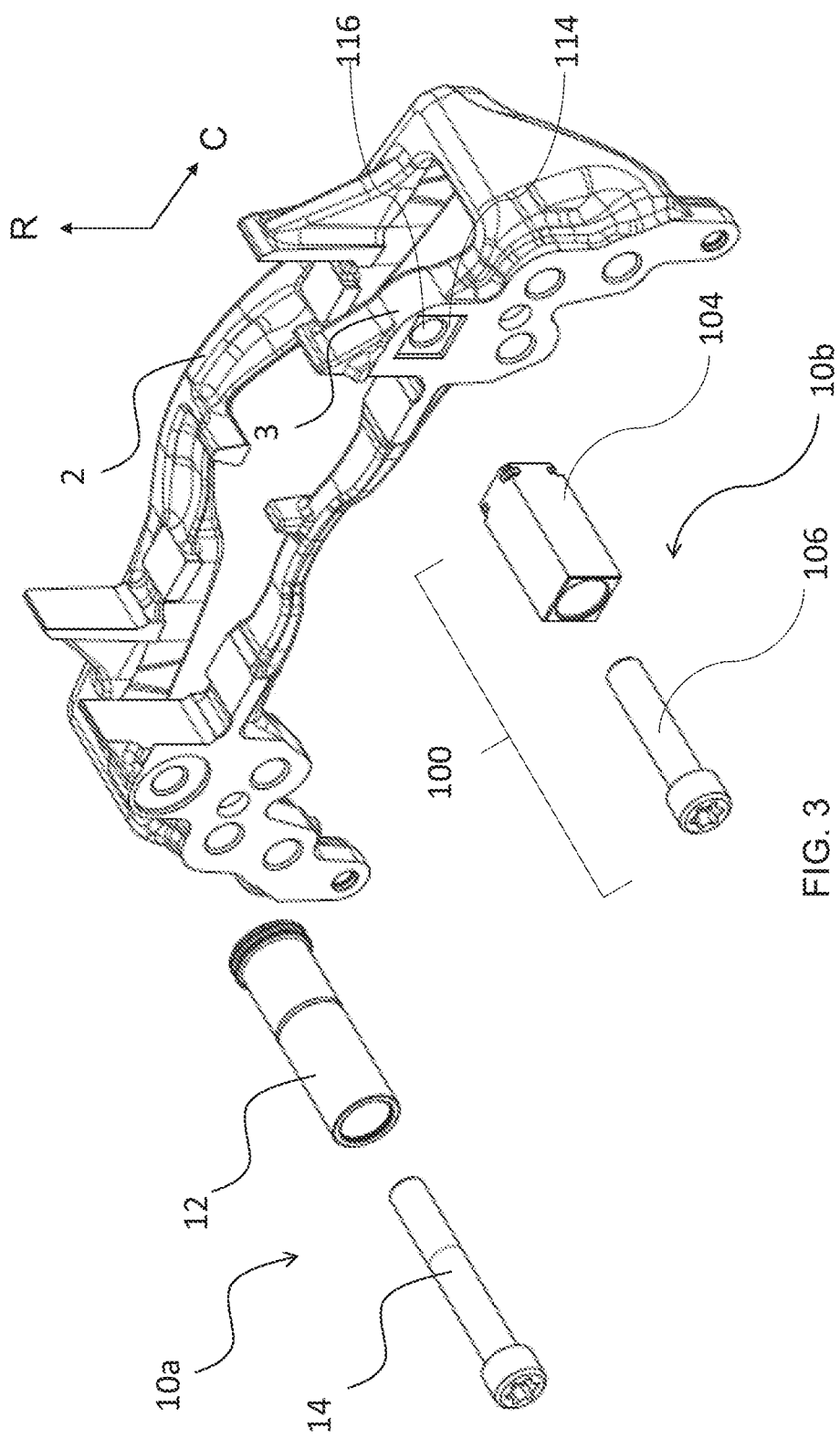
FIG. 3 is an exploded isometric view showing a brake carrier and two guide assemblies of the disc brake of FIG. 2.
Figure 4:
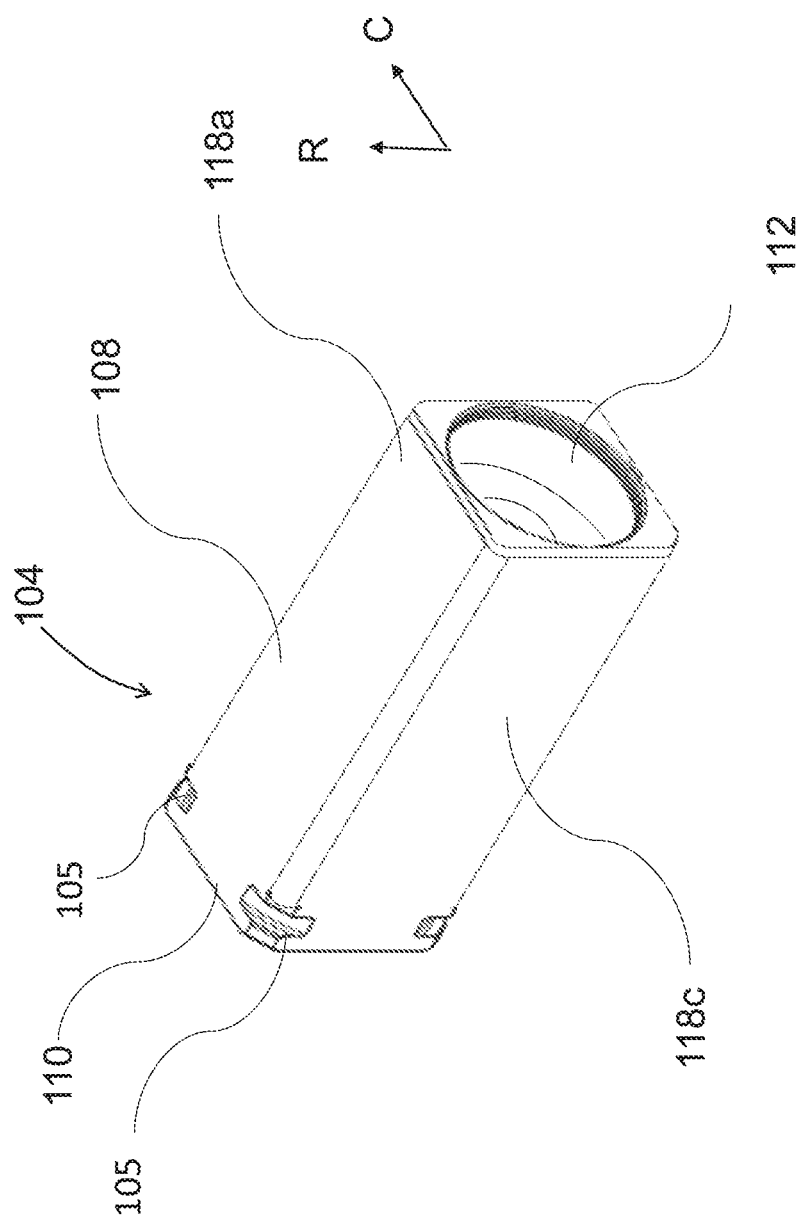
FIG. 4 is an isometric view of a guide pin according to the first embodiment of the guide assembly.

As shown in FIGS. 2 and 3, the guide pins may be mounted on the brake carrier 2 (acting as a supportive member) and extend from the inboard side of the brake carrier into respective bores formed in the brake caliper 8 so that the brake caliper can slide over the guide pins relative to the brake carrier 2. In an alternative disc brake embodiment (not shown), the guide pins may be mounted on the brake caliper (acting as a supportive member) and extend from the brake caliper within respective sliding bores of the brake carrier so that the brake caliper can slide relative to the brake carrier as the guide pins slide within the bores.

One of the guide assemblies 10b may be shorter than the other guide assembly 10a in order to accommodate vehicle installation constraints and/or because one acts the primary guide on the leading edge in normal direction of rotation and the other acts as a secondary guide. In an alternative embodiment the guide pins may be of equal length.

The disc brake further comprises an actuator 11 for moving the inboard brake pad 4a into frictional contact with the brake rotor 6 when the disc brake is actuated (via a suitable mechanism (not shown) located within the caliper 8). When the inboard brake pad 4a is pushed by the actuator 11 into contact with the rotor 6, a reaction force F drives the brake caliper 8 to slide inboard relative to the brake carrier 2. As the brake caliper 8 slides inboard towards the brake carrier 2, it moves the outboard brake pad 4b towards the brake rotor 6. Hence, the brake rotor 6 becomes clamped between the inboard and outboard brake pads 4a, 4b and the rotation of the brake rotor is frictionally inhibited.

To improve the sliding action of the brake caliper 8 relative to the brake carrier 2, at least one of the guide assemblies of the disc brake is a guide assembly 10b according to the present teachings where the guide pin and sliding bore comprise at least one corresponding pin face and bore face that mate to form at least at first sliding interface therebetween. For example, in the disc brake depicted in the FIGS. 1 to 5, the first guide assembly 10a has a conventional design comprising a guide pin with a generally circular guide sleeve 12 and a bolt 14 to secure the sleeve to the brake carrier 2, and a generally circular bore (not shown) formed in the brake caliper 8 to receive the guide pin and form a sliding contact. The sleeve 14 and the bore are a close running fit to accurately control the relative radial and circumferential positions of the caliper 8 relative to the carrier 2.

The second guide assembly 10b of the disc brake is first embodiment of a guide assembly according to the present teachings that comprises a guide pin 100 and a sliding bore 102 formed in the brake caliper 8 to receive the guide pin and form at least a first sliding interface contact. In an alternative configuration of the disc brake, the sliding bore may be formed in the brake carrier.

The guide pin 100 may comprise a hollow guide sleeve 104 and a guide bolt 106 as shown in FIG. 1 to 9. The guide sleeve may comprise a guiding portion 108, a mounting portion 110 and a stepped bolt hole 112 extending therethrough. The bolt hole 110 is stepped with an increased diameter end to accommodate a head of the guide bolt 106 and hold the guide sleeve in compression in contact with the carrier 2 when the guide bolt is tightened. In an alternative embodiment, the guide pin may comprise a monolithic body, as explained below. In both embodiments the guide pin 100 is mounted to an inboard face of the carrier 2 and extends inboard therefrom (i.e., away from the brake rotor 6).

The guide pin 100 is mounted to a portion of the carrier 2 that extends radially outwardly to form an abutment 3. This is a strong part of the carrier with sufficient space to form such a mounting. The abutment takes the (circumferentially directed) braking load from the inboard brake pad 4a under braking and transmits it to the carrier.

The guide sleeve 104 may have a regular or non-regular polygonal external cross-sectional profile suitable for forming at least a first sliding interface between the guide pin and the sliding bore. In the embodiment depicted in FIGS. 1 to 5, the guide sleeve has a square profile. However, the profile may alternatively trapezoidal, rectangular, hexagonal or octagonal, for example.

The cross-sectional profile may be constant along the length of the guide sleeve 104. As a result, the guiding portion 108 and mounting portion 110 have the same profile as shown. In an alternative embodiment, the cross-sectional profile of the guide sleeve may vary along its length such that the guiding portion and mounting portion have different profiles.

The mounting portion 110 may be arranged at the first end region of the guide sleeve 104 and configured to be disposed in a corresponding retaining recess or bore on the brake carrier so as to position the guide sleeve relative to the brake carrier. In the embodiment depicted in FIGS. 1 to 5, the square shaped mounting portion 110 is disposed in a corresponding square retaining recess 114 formed in the brake carrier. The corners of the mounting portion 110 may be chamfered, as shown, to ease fitting of the guide sleeve 104 into the retaining recess or bore 114, and minimize stress raisers in use as shown. The guide bolt 106 may be configured to extend through the guide sleeve 104 and be screwed into a threaded receiving hole 116 in the brake carrier in order to secure the guide sleeve to the brake carrier. In an alternative embodiment, when the sliding bore is formed in the brake carrier, the guide pin may be configured to be mounted on the brake caliper.

It will be noted that between the guiding portion 108 and the mounting portion 110, recesses 105 are provided at each corner. These recesses 105 are arranged to mount a convoluted boot or seal (not shown) that extends between the guide pin 100 and the caliper 8 to protect the guiding portion 108 from foreign matter and corrosion.

Due to the polygonal cross-sectional profile of the guide sleeve, the guiding portion has multiple pin faces. In the embodiment depicted in FIGS. 1 to 5 where the guide sleeve 104 has a square cross-sectional profile, the guiding portion 108 comprises four pin faces 118a-d extending the length of the guiding portion. As shown in the Figures, the pin faces 118a-d may be substantially flat (planar), however in alternative embodiments the pin faces may be curved (convex or concave), but still be faceted (i.e., have distinct vertices between faces).

The sliding bore 102 of the guide assembly may be defined by a bore hole (through hole) extending through the brake caliper 8 as depicted in FIGS. 1 to 5. In an alternative embodiment when a bush is disposed in the bore hole, recess or slot as explained below, the sliding bore may be defined by the bush.

To form a face mating contact with the guiding portion 108, the sliding bore 102 may comprise at least one bore face that has a corresponding profile to at least one respective pin face 118a-d of the guiding portion. In the embodiment depicted in FIGS. 1 to 5, the sliding bore 102 comprises a bore hole formed in the brake caliper 8 with a generally square profile and the inner surfaces of the bore hole define four bore faces 120*a-d*. The opposing first bore face 120*a* and second bore face 120*b* are generally flat inner surfaces extending circumferentially and configured to correspond to the opposing circumferential pin faces 118*a, b* of the guiding portion. The opposing third bore face 120*c* and fourth bore face 120*d* are generally concave, radial inner surfaces. This arrangement may assist the machining of the sliding bore, as well as reducing stress raisers in operation by avoiding sharp angles.

In this embodiment, the geometry of the guiding portion 108 and sliding bore 102 are configured such that, when the guiding portion is located in the bore, the first bore face 120*a* mates the first pin face 118*a* creates a first sliding interface 122*a* between the guiding portion 108 and the sliding bore 102. At least a partial face mating contact is formed between the first pin face 118*a* and the first bore face 120*a*. To optimize the first sliding interface, preferably a whole face mating contact is formed as depicted. In other words, substantially the entire axial extent of the first bore face 120*a* and substantially the entire extent of the first pin face are as depicted, creating a large rectangular contact interface 122*a* between the two.

As such, the brake caliper is supported by the guide pin and is able to slide along the first pin face when the disc brake is actuated. Advantageously, due to the face mating contact, the first sliding interface has an increased surface area over conventional guide assemblies with circular or oval geometries. Consequently, stress and wear are reduced and the sliding action of the brake caliper 8 is enhanced.

In this embodiment, the geometry of the guiding portion 108 and bore 102 are further configured such that when the guiding portion is located within the bore, at least a partial face mating contact also forms between the second bore face 120*b* and the second pin face 10*b*, creating a second sliding interface 122*b*. Accordingly, the brake caliper 8 is able to slide along the second pin face during use. As depicted, the second pin face 118*b* opposes the first pin face 118*a*, likewise the second bore face 120*b* opposes the first bore face 120*a*. This additional second sliding interface between the mating faces of the guide pin and the sliding bore further reduces stress and wear, and further improves the support and sliding action of the brake caliper. A close running clearance exists at each sliding interface 122*a* and 122*b* to ensure free running of the caliper 8 along axis A-A, whilst minimizing play that can lead to rattling.

Figure 5:
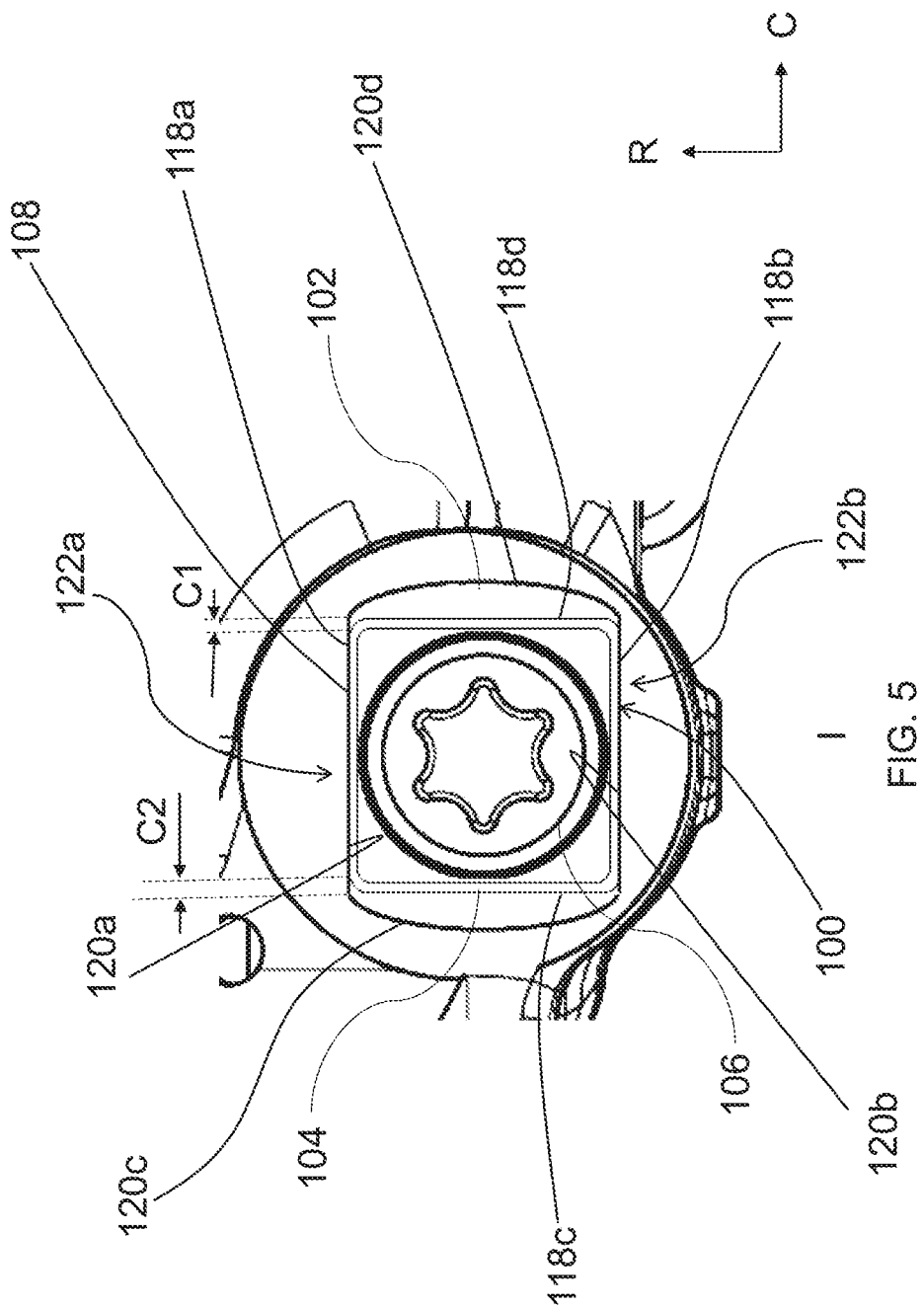
FIG. 5 is an enlarged view of the inboard end of the guide pin and sliding bore according to the first embodiment of the guide assembly, showing the guide pin located in the sliding bore.

It can be seen in FIG. 5 that the first and second bore faces 120*a, b* are wider than the corresponding first and second pin faces 118*a, b*, when the chamfered corners are taken into account, by dimensions C1 and C2. Further, the concave third and fourth bore faces 120*c, d* accommodate the chamfered corners when the first and second pin faces 118*a, b* are transversely off-center with respect to the first and second bore faces 120*a, b*. This allows for circumferential (transverse) movement of the guide pin 100 to occur, whilst allowing free running in an axial direction—parallel to axis A-A. For the guide pin 100 this is important as it allows the axial movement to occur without binding or jamming that can be caused by manufacturing tolerances, heat expansion, wear of the other guide assembly or deflection of the caliper 8 under brake loads.

The first and sliding interfaces 122*a*, 122*b* of this embodiment are circumferential sliding interfaces that are formed simultaneously when the guide pin is received in the sliding bore. That is, the geometry of the guiding portion and sliding bore is such that the first and second tangential pin faces 118*a*, 118*b* mate with the first and second tangential bore faces 120*a*, 120*b* when the guide pin is received in the sliding bore.

Figure 6:
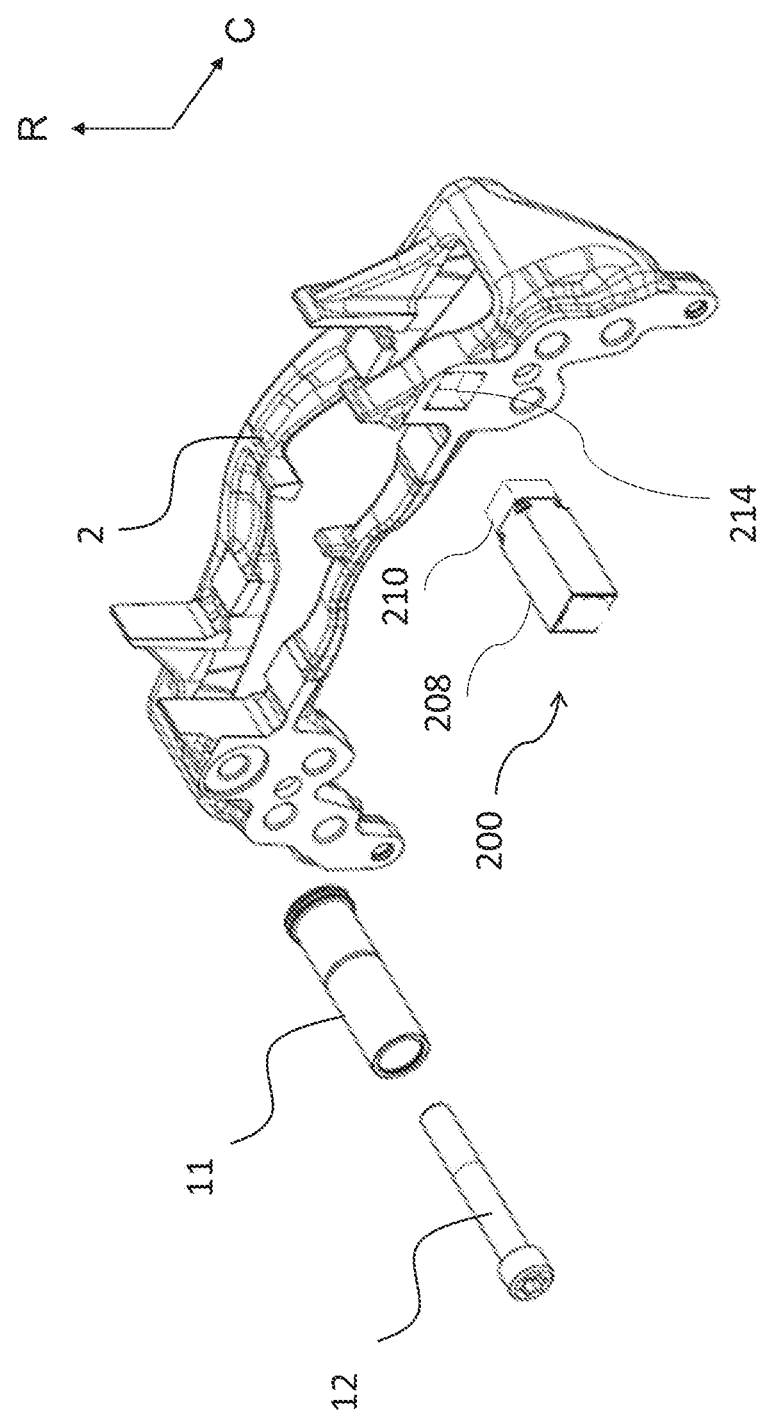
FIG. 6 is an exploded isometric view showing the brake carrier and two guide assemblies of a disc brake according to a second embodiment of the present teachings.
Figure 7:
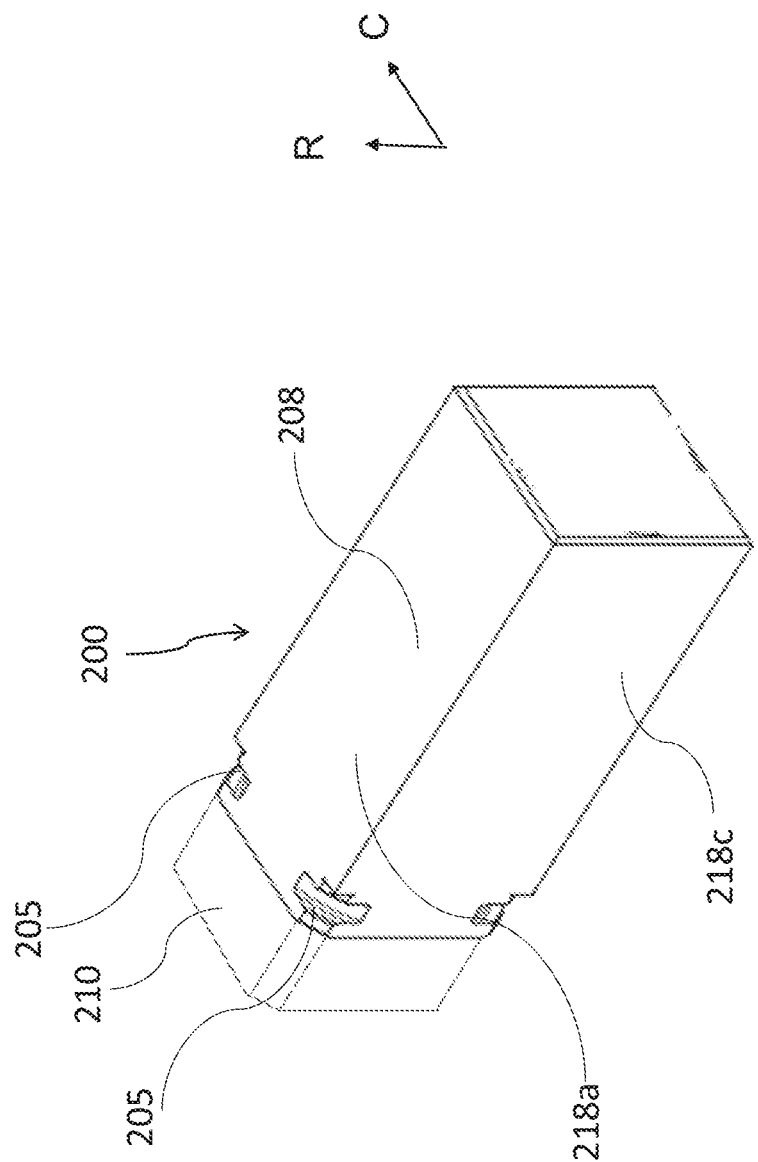
FIG. 7 is a perspective view of a guide pin of the guide assembly of FIG. 6.
Figure 8:
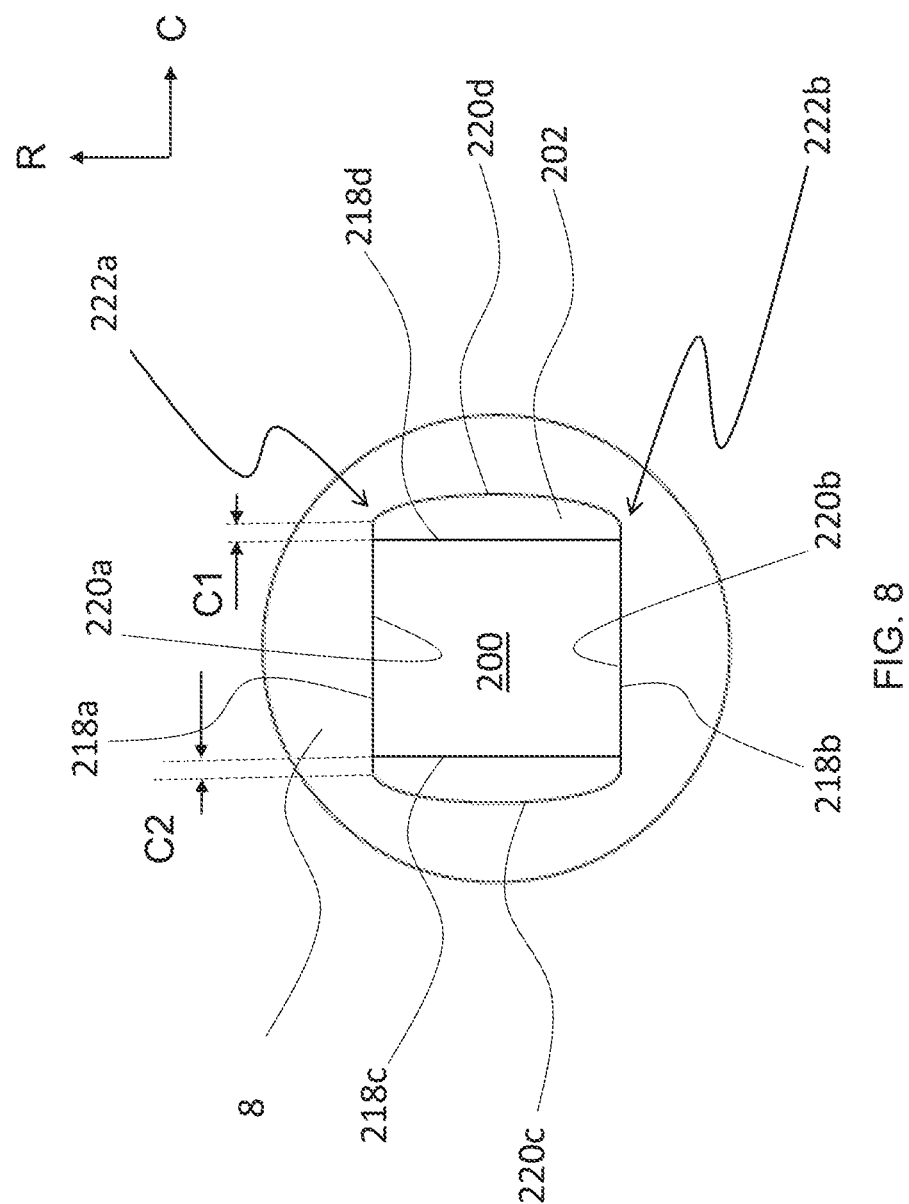
FIG. 8 is an enlarged inboard end view of the guide pin and sliding bore according to a third embodiment of the guide assembly, showing the pin faces, bore faces, first and second sliding interfaces.
Figure 9:
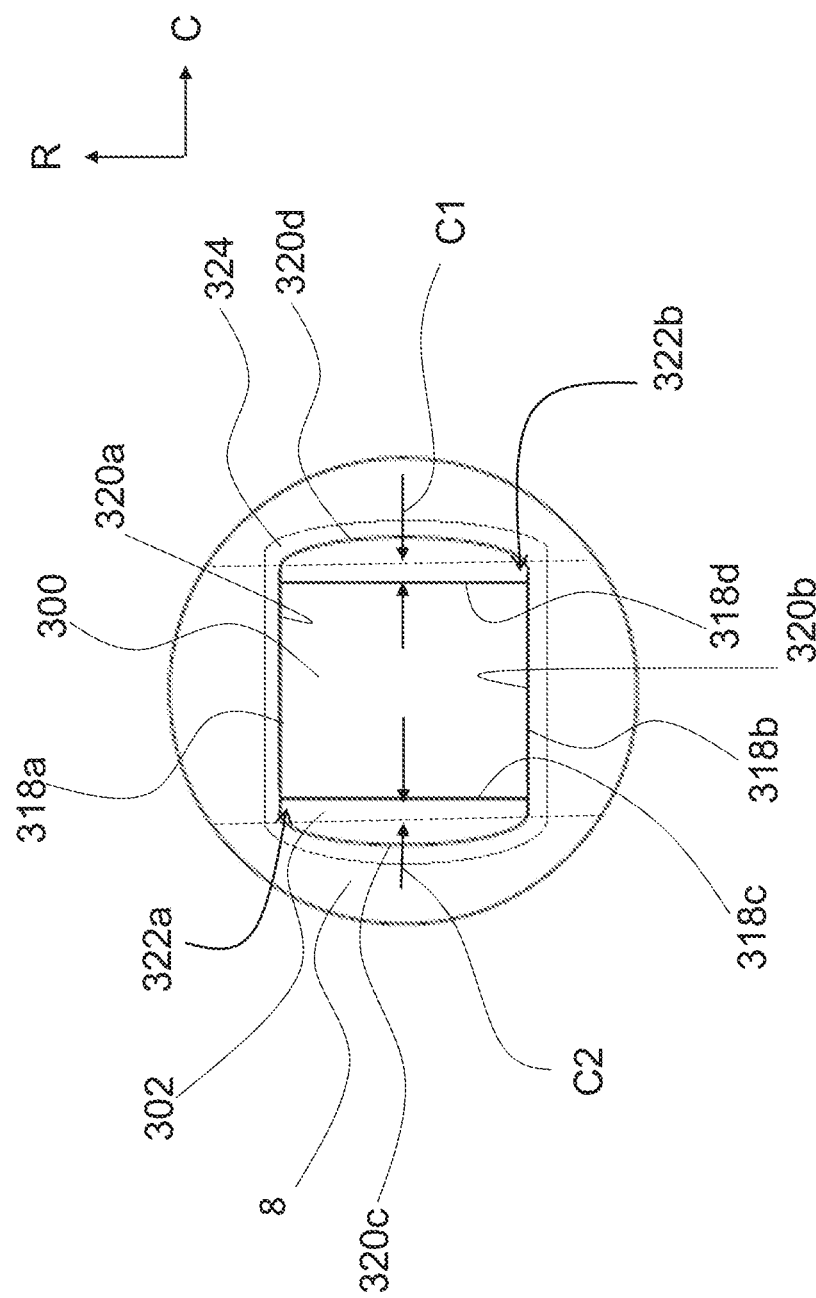
FIG. 9 is an enlarged front view of a guide pin and sliding bore according to a fourth embodiment of a guide assembly of the present teachings, where the guide assembly comprises a tangential clearance between the guide pin and sliding bore.

In direct contrast to the guide pin of the first embodiment comprising a guide sleeve and bolt, the guide assembly of the second embodiment of FIGS. 6, 7, and 8 comprises a guide pin 200 and sliding bore 202, where the guide pin comprises a monolithic body with a guiding portion 208 and a mounting portion 210 and no mounting bolt.

By having a one-piece (monolithic) structure, the guide pin 200 has a simple design that is easy and low cost to manufacture. The problems associated with fitting, relative movement and the loosening of guide pins with multiple components is reduced or avoided.

The monolithic body may have a regular or non-regular polygonal cross-sectional profile suitable for forming at least a first sliding interface between the guide pin 200 and the sliding bore 202. For example, the monolithic body may have a trapezoidal, rectangular, square, hexagonal or octagonal profile. It will be noted that between the guiding portion 208 and the mounting portion 210, recesses 205 are provided at each corner. These recesses 205 are arranged to mount a convoluted boot or seal (not shown) that extends between the guide pin 200 and the caliper 8 to protect the guiding portion 208 from foreign matter and corrosion.

The monolithic body may be solid or hollow.

In this embodiment of the guide assembly, the monolithic body comprises a solid, rectangular bar.

As depicted, the cross-sectional profile may be different along the length of the monolithic body and so the guiding portion and mounting portion have the same profile (in this case, by virtue of the chamfers on the mounting portion 210 that are not present on the guiding portion 208, as well as the recesses 205). In an alternative embodiment, the cross-sectional profile of the monolithic guide pin may be constant along its length. As such, the mounting portion and guiding portion may have the same profiles.

The mounting portion 210 is arranged at the first end region of the body and is configured to be press-fitted or shrink-fitted into a corresponding retaining recess or bore 214 on the brake carrier 2 so as to mount the guide pin on the brake carrier with an interference fit. As shown, the corners of the mounting portion 210 are chamfered to enhance the fitting of the mounting portion into the retaining recess 214 or bore of the brake carrier 2. In an alternative embodiment (not shown) when the sliding bore is formed in the brake carrier, the mounting portion 110 may be configured to be press-fitted into a corresponding retaining recess or bore formed in the brake caliper in order to mount the guide pin on the brake caliper.

Due to the rectangular profile of the monolithic body, the guiding portion 208 comprises four pin faces 218*a-d* extending the length of the guiding portion as can be seen in FIGS. 7 and 8. In this embodiment, the pin faces are substantially flat. In an alternative embodiment, the pin faces may be curved (convex or concave) as discussed above.

In the embodiment depicted in FIGS. 6 to 8 the sliding bore 202 is a bore hole (through hole) extending through the brake caliper 8. The bore hole has a generally rectangular shape and the inner surface of the bore hole define four bore faces 220*a-d*. The opposing first bore face 220*a* and second bore face 220*b* are generally flat, radial inner surfaces and configured to correspond to the opposing circumferential pin faces 218*a*, 218*b* of the guiding portion. The opposing third bore face 220*c* and fourth bore face 220*d* are generally concave, radial inner surfaces.

As shown, the geometry of the guiding portion and bore are configured such that, when the guiding portion is located in the bore, the first bore face 220a mates with a first pin face 218a creating a first sliding interface 222a between the guide pin and the bore and the second bore face 220b mates with the second pin face 218b creating a second sliding interface 222b. The first and second sliding interfaces are circumferential sliding interfaces that are formed simultaneously when the guide pin is received in the bore, and the brake caliper 8 is able to slide along the first and second pin faces 218a, b when the disc brake is actuated.

Unlike the first embodiment, the guiding portion 208 does not have chamfered corners between the adjacent pin faces 218a-d. In order to provide for the circumferential (transverse) movement of the guide pin 200 to occur within the sliding bore 202, whilst allowing free running in an axial direction, the first and second bore faces 220a and b are wider than the corresponding pin faces 218a, b as denoted by clearances C1 and C2. The width is such that even at extreme design conditions of wear, temperature or load, the corners of adjacent pin faces 218a-d will not reach the corners of the adjacent bore faces 220a-d, to avoid placing undue stresses on the caliper 8, or risk binding or jamming between the guide pin 200 and the sliding bore 202.

The guide assembly may alternatively comprise a sliding bore 302 defined by a bush disposed in a bore hole, recess or slot of the brake caliper or brake carrier. In a third embodiment depicted in FIG. 9, the guide assembly 310b comprises a monolithic guide pin 300 and a sliding bore 302 defined by a bush 324 disposed in a bore hole of the brake caliper 8. In such an embodiment, the first and second bore faces 320a, 320b are defined by first and second radial inner surfaces of the bush 324, and these mate with the corresponding first and second radial pin faces 318a, 318b of the guiding portion to simultaneously form the first and second sliding interfaces 322a, 322b.

The bush 324 may be formed from elastomeric material, such as synthetic rubber; metal, such as bronze; or a combination of the two. Elastomeric material may be used to improve damping and reduce rattling noise of the guide pin 300, whereas metal may be selected to improve wear resistance and reduce friction by comparison with the cast metal of the caliper 8. Further, the manufacture of a bush with at least one suitable inner surface configured to correspond and mate with respective pin faces may be easier and less time consuming than accurately forming a bore hole and providing a suitable treatment to enhance its durability (e.g., by induction hardening or nitriding) directly in the caliper 8.

As mentioned previously, the guide pin may have any suitable polygonal cross-sectional profile. By way of example, FIG. 10 depicts a fourth embodiment of a guide assembly where the guide pin 400 comprises a guide sleeve 404 with an octagonal cross-sectional profile, a guide bolt 406, and a sliding bore 402 with a generally rectangular profile comprising flat radial bore faces and concave circumferential bore faces to provide similar clearances C and C2 to those of FIG. 5.

It will be appreciated that numerous changes may be made within the scope of the present teachings. For example, the embodiments of FIGS. 5, 8 and 10 may also utilize bushes. The bushes may not have a constant wall thickness. For example, a cylindrical bore may be formed in the caliper and a bush inserted that has a cylindrical outer profile, but a rectangular or other non-circular internal profile. Both guide pins may be manufactured in accordance with the teachings, or only the first guide assembly. In this case four (or more) mating faces have a close running fit to control the radial and circumferential position of the caliper.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A guide assembly of a disc brake comprising:
   a guide pin that includes a guiding portion having a polygonal cross-sectional profile; and
   a sliding bore that receives the guide pin, the sliding bore including a first bore face configured to form a first face mating interface with a corresponding first pin face of the guiding portion when the guiding portion is received in the sliding bore; and
   wherein the first face mating interface defines a first sliding interface between the guide pin and the sliding bore.

2. The guide assembly of claim 1 wherein the sliding bore comprises a second bore face and the guiding portion comprises a corresponding second pin face, wherein the second bore face and second pin face are configured to form a second face mating interface when the guiding portion is received in the sliding bore; and wherein the second face mating interface defines a second sliding interface between the guide pin and the sliding bore.

3. The guide assembly of claim 2 wherein the first bore face and second bore face are opposing faces.

4. The guide assembly of claim 2 wherein the first sliding interface and second sliding interface are formed simultaneously when the guiding portion is received in the sliding bore.

5. The guide assembly of claim 1 including one or more clearances between the sliding bore and the guiding portion.

6. The guide assembly of claim 5 wherein each of the one or more clearances is a circumferential clearance between the sliding bore and the guiding portion.

7. The guide assembly of claim 1 wherein the sliding bore is arranged in a brake caliper.

8. The guide assembly of claim 1 wherein the sliding bore is defined by a through hole.

9. The guide assembly of claim 1 wherein the sliding bore is defined by a bush disposed in a through hole.

10. The guide assembly of claim 1 wherein the guide pin comprises a guide sleeve defining the polygonal cross-sectional profile of the guiding portion and a fastener for securing the guide sleeve to a carrier of the disc brake.

11. The guide assembly of claim 1 wherein the guide pin comprises a monolithic body defining the polygonal cross-sectional profile of the guiding portion.

12. The guide assembly of claim 11 wherein the monolithic body further comprises a mounting portion configured to mount the guide pin to one of a carrier or caliper.

13. A disc brake comprising:
   a brake carrier;
   a brake caliper; and
   a guide assembly that includes:
      a guide pin that includes a guiding portion having a polygonal cross-sectional profile; and
      a sliding bore that receives the guide pin, the sliding bore including a first bore face configured to form a first face mating interface with a corresponding first pin face of the guiding portion when the guiding portion is received in the sliding bore, wherein the first face mating interface defines a first sliding interface between the guide pin and the sliding bore.

14. The disc brake of claim 13 wherein the guide pin is mounted to the brake carrier and extends inboard of the brake carrier.

15. A method for slidably arranging a guide pin of disc brake, the method comprising:
- providing a guide pin that includes a guiding portion with a polygonal cross-sectional profile, the guiding portion comprising a first pin face;
- providing a sliding bore that includes a first bore face, wherein the first bore face has a corresponding profile to the first pin face;
- locating the guiding portion in the sliding bore; and
- forming a first face mating interface between the first pin face and first bore face, wherein the first face mating interface defines a first sliding interface between the guide pin and the sliding bore.

* * * * *